May 24, 1960     A. N. LEHBERGER     2,937,492
ROTARY REACTION ENGINE
Filed Oct. 21, 1954                       6 Sheets-Sheet 1
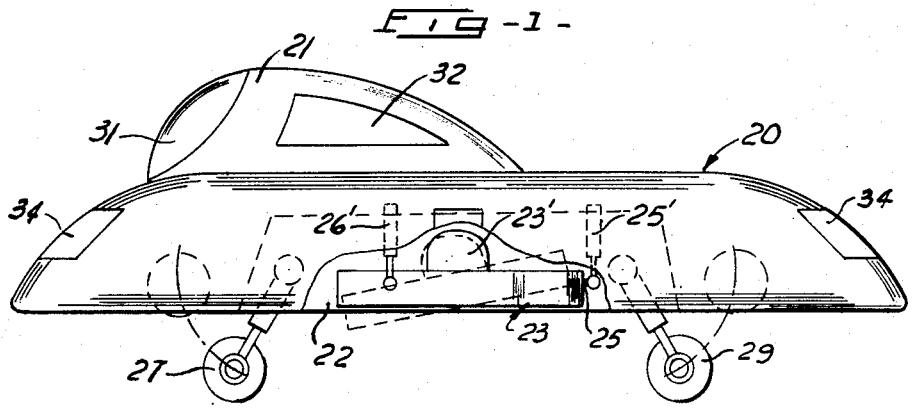
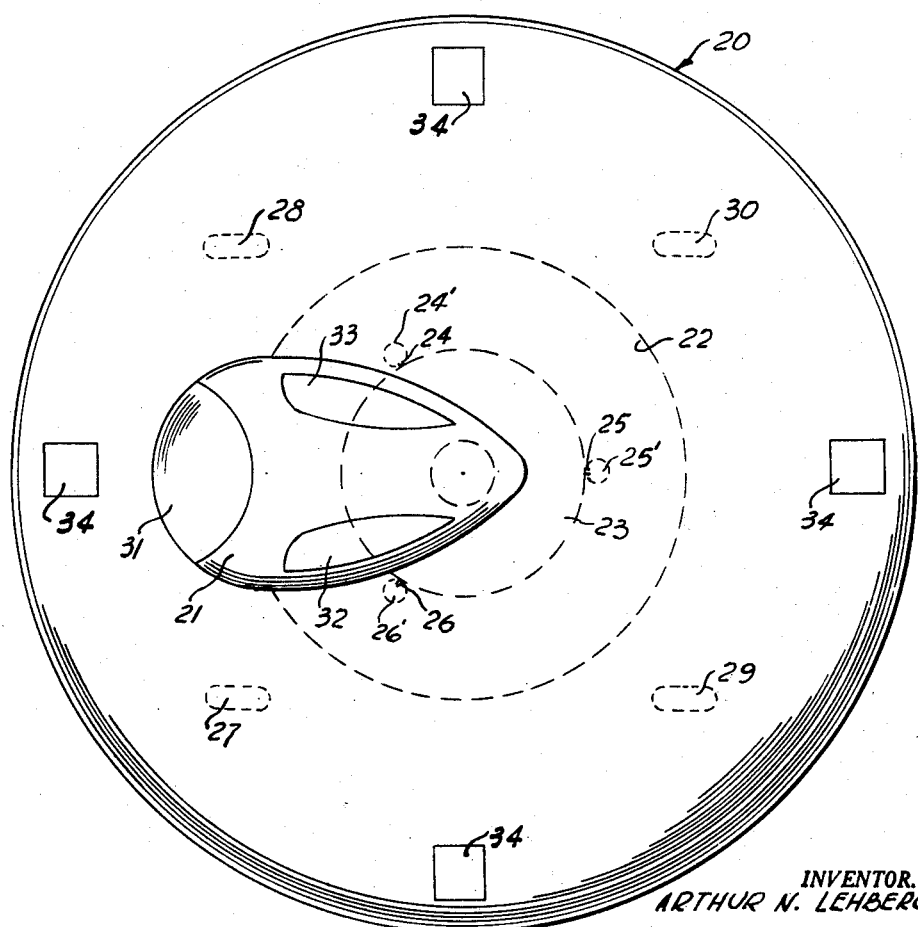
INVENTOR.
ARTHUR N. LEHBERGER
BY
L. S. Saulsbury
ATTORNEY May 24, 1960  A. N. LEHBERGER  2,937,492
ROTARY REACTION ENGINE
Filed Oct. 21, 1954  6 Sheets-Sheet 2
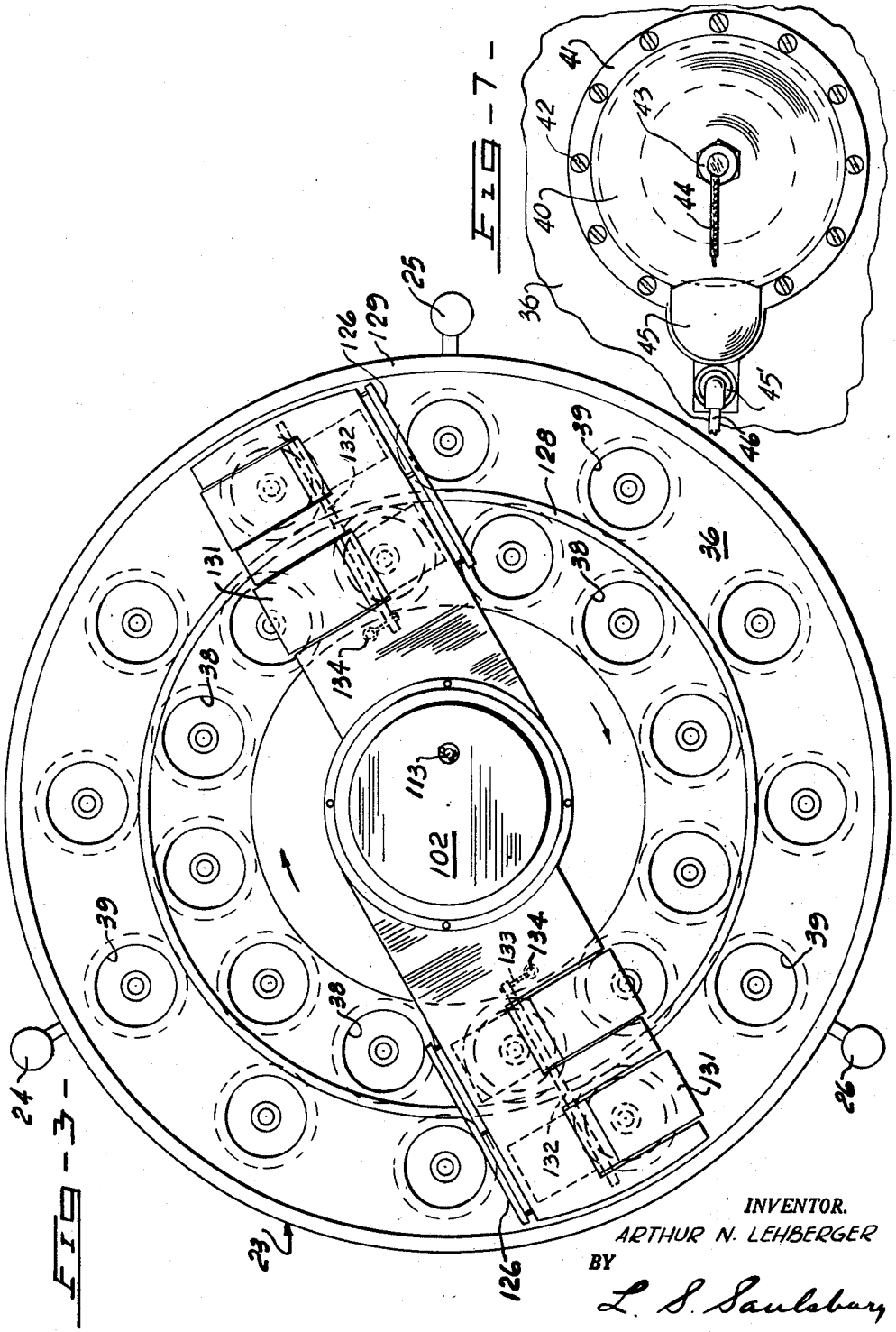
INVENTOR.
ARTHUR N. LEHBERGER
BY
L. S. Saulsbury
ATTORNEY

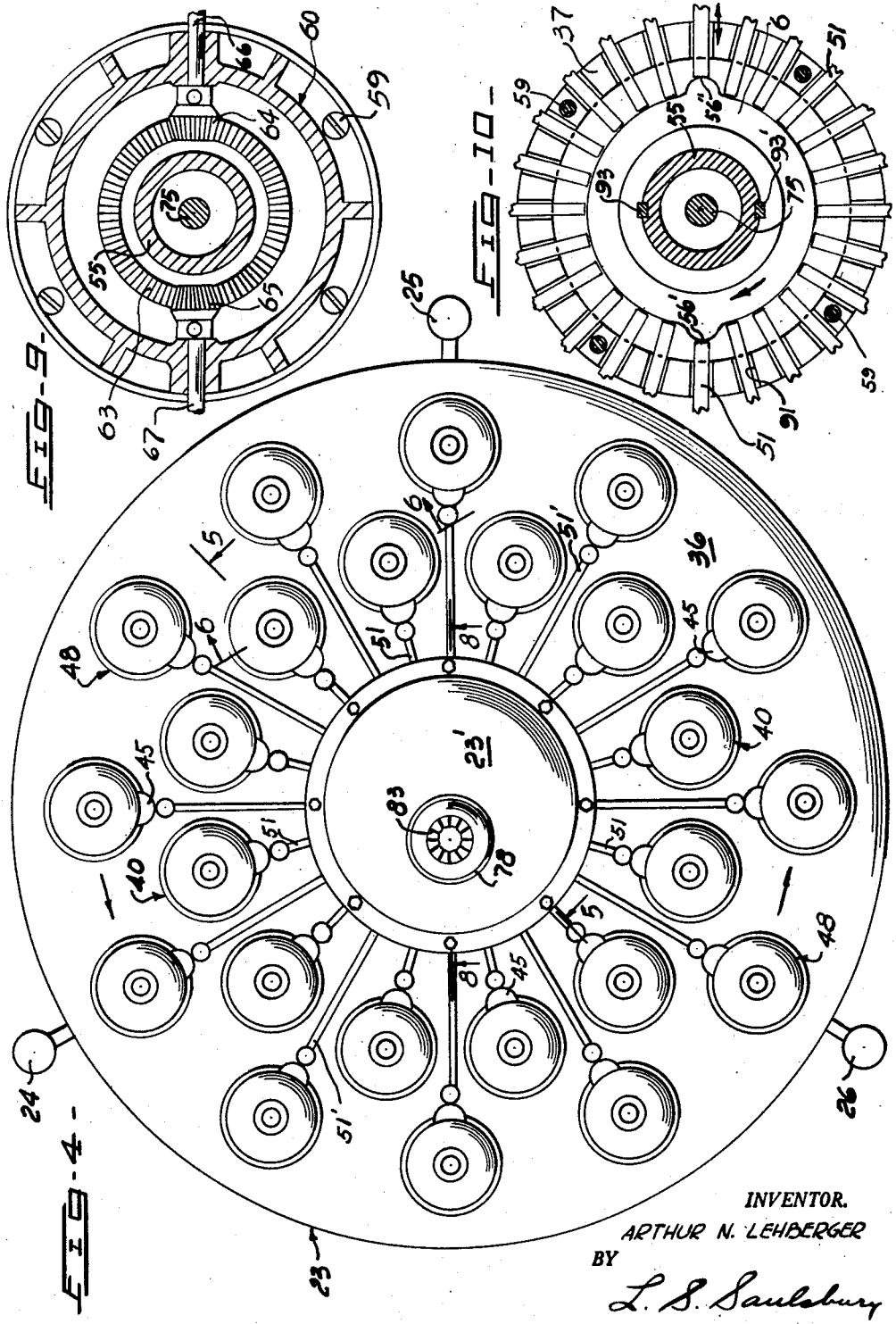

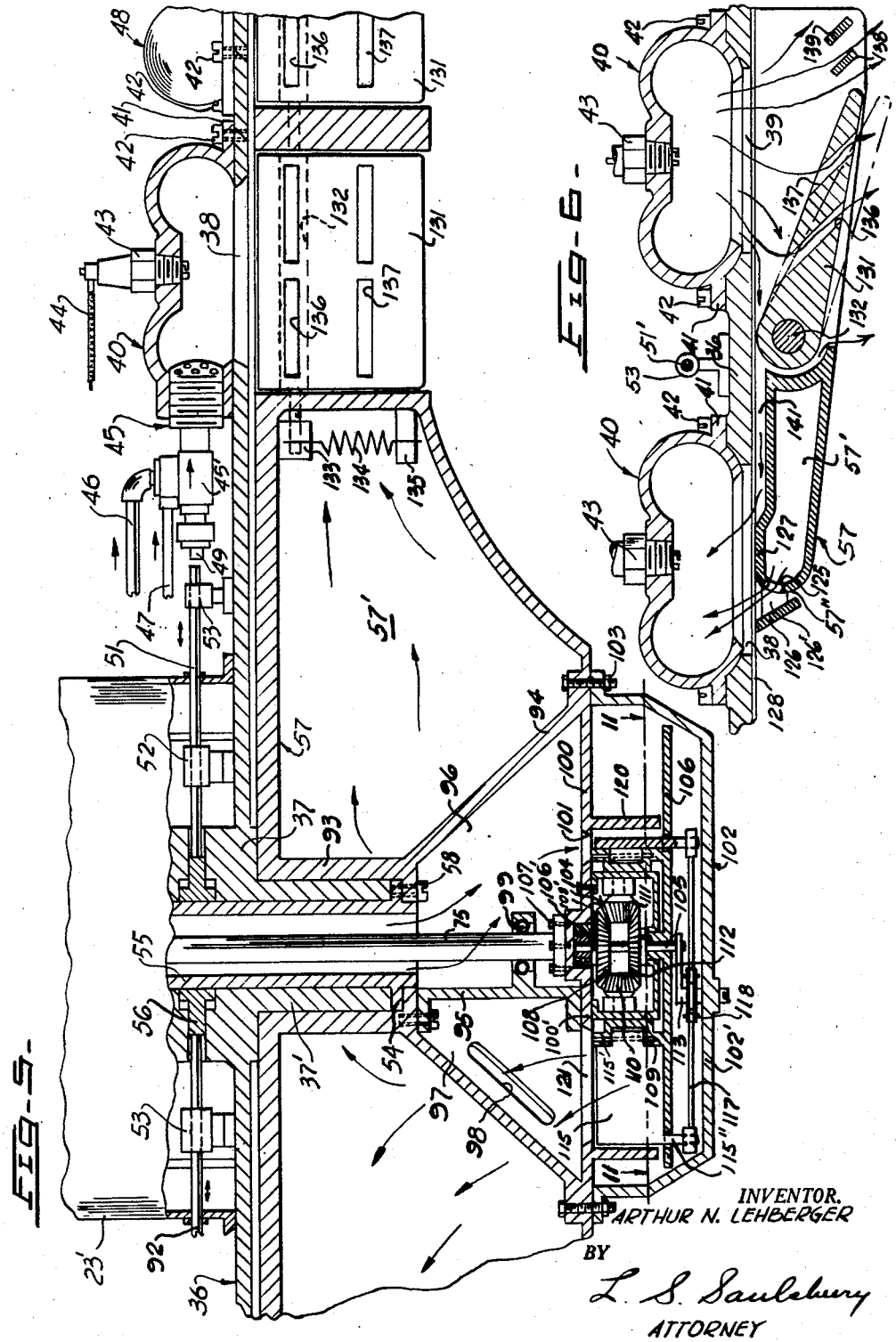

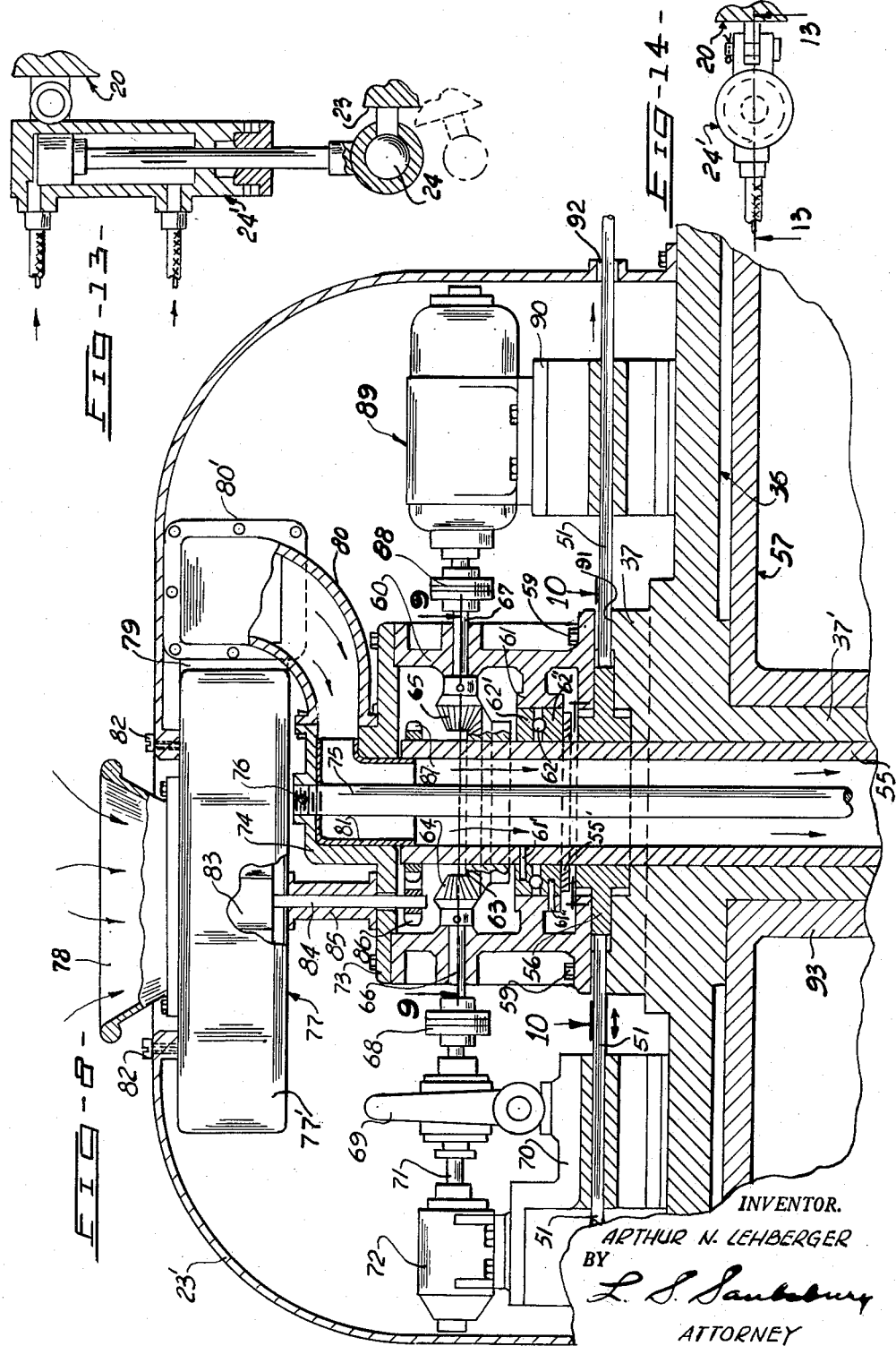

May 24, 1960 A. N. LEHBERGER 2,937,492
ROTARY REACTION ENGINE
Filed Oct. 21, 1954 6 Sheets-Sheet 6
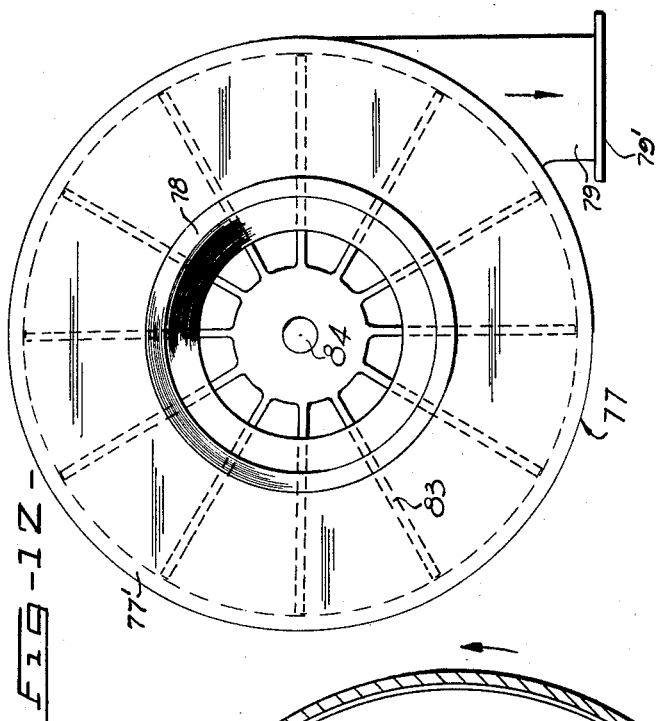
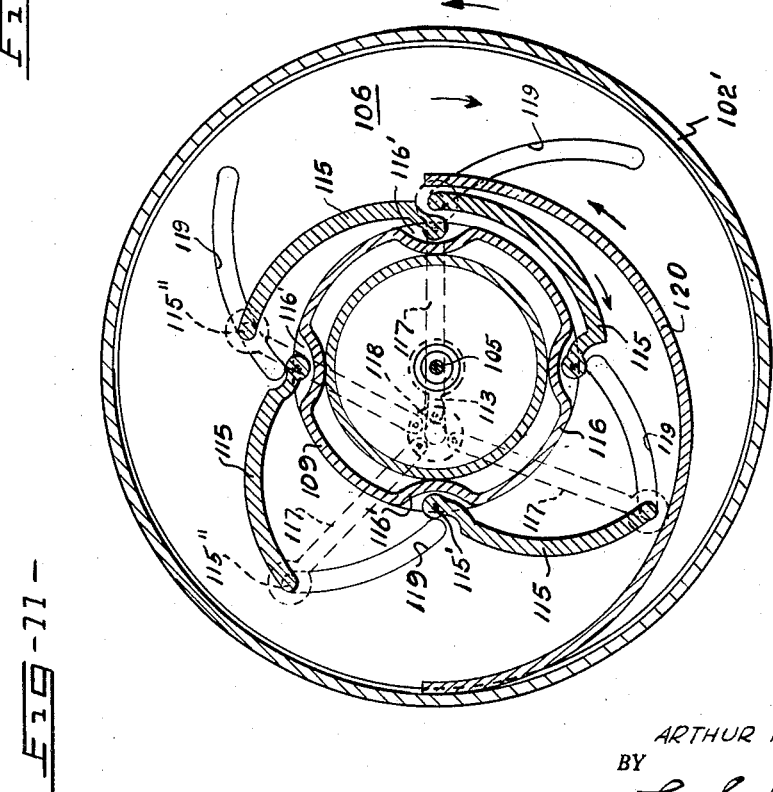
INVENTOR.
ARTHUR N. LEHBERGER
BY
*L. S. Saulsbury*
ATTORNEY ly along line 5—5 of Fig. 4 through the center of
United States Patent Office
2,937,492
Patented May 24, 1960

2,937,492
ROTARY REACTION ENGINE
Arthur N. Lehberger, 256 Winfield Terrace, Union, N.J.

Filed Oct. 21, 1954, Ser. No. 463,705

7 Claims. (Cl. 60—35.6)

This invention relates to rotary reaction engines for propelling space ships in air.

It is an object of the present invention to provide a rotary reaction engine adapted to expel from its underside a downwardly and outwardly projected or umbrella-shaped lifting gas discharge, serving when attached to the bottom of a space ship to lift the ship from the ground and into the air space.

It is another object of the invention to provide a rotary reaction engine which can be incorporated in the space ship in such a manner as to be adjustable relative thereto so as to control the directional movement of the space ship as well as lift the ship.

It is another object of the invention to provide in a rotary reaction engine suitable air supply means for compressing and delivering air to the firing chambers wherein this supply of air is delivered by a hollow rotating blade structure to the firing chambers.

It is still another object of the invention to provide in a rotary reaction engine an arrangement of firing chambers under which a rotating blade structure passes wherein the firing of one chamber directs gases along the top of the blade structure to a preceding firing chamber that compresses the fuel and air mixture charge therein preparatory to ignition of that firing chamber.

It is a further object of the invention to provide a rotary reaction engine having an air charging rotating blade structure which serves both as a firing chamber part and as means for forming the lifting gas pattern and that has an explosion-resisting member on the trailing edge of the blade structure against which the main thrust of the discharge is directed but which is releasable on too heavy or excess explosion taking place so as at such times to prevent damage to the blade structure.

It is a still further object of the invention to provide a rotary reaction engine utilizing a rotary blade structure that serves as a combined air-distributor and firing chamber part wherein the required auxiliary equipment is self-contained on the engine and located on the top thereof removed from the blade structure but which will be operated by the blade structure in the underside of the engine.

Other objects of the invention are to provide a rotary reaction engine having the above objects in mind which is simple in construction, has a minimum number of parts, easy to assemble, light in weight, compact, durable, easy to mount on a space ship, efficient and effective in operation.

For a better understanding of the invention, reference may be had to the following detailed description taken in connection with the accompanying drawing, in which:

Figure 1 is an elevational view of a space ship having the rotary reaction engine of the present invention mounted therein with the landing gear extended and with the space ship broken away to show the reaction engine in full and with illustration made as to the manner in which the reaction engine is tilted to control the direction of movement of the ship in flight;

Fig. 2 is a top plan view of the space ship shown in Fig. 1 showing the arrangement of the landing gear and the three hydraulic control cylinders for securing the reaction engine to the bottom of the ship;

Fig. 3 is an enlarged bottom plan view of the rotary reaction engine removed from the space ship;

Fig. 4 is an enlarged top plan view of the rotary reaction engine;

Fig. 5 is an enlarged fragmentary sectional view taken generally along line 5—5 of Fig. 4 through the center of the reaction engine including one of the firing chambers and the hollow blade structure;

Fig. 6 is an enlarged fragmentary sectional view taken through two combustion chambers and transversely of the hollow rotating blade structure with the gases being exhausted from the trailing edge of the part, this view being taken generally along line 6—6 of Fig. 4;

Fig. 7 is a fragmentary plan view looking upon the top one of the upper firing chambers;

Fig. 8 is an enlarged fragmentary vertical sectional view taken through the center of the engine along the line 8—8 of Fig. 4 showing the auxiliary equipment and the drive gear mechanism therefor and the timing cam for the fuel injectors;

Fig. 9 is a transverse sectional view taken through the bevel drive gear for the auxiliary equipment as viewed on line 9—9 of Fig. 8;

Fig. 10 is a transverse sectional view taken along the line 10—10 of Fig. 8 and looking upon the timing cam that operates the fuel injection rods;

Fig. 11 is an enlarged transverse sectional view of the air supply booster pump as viewed on line 11—11 of Fig. 5;

Fig. 12 is a top plan view of the centrifugal air intake pump;

Fig. 13 is a vertical sectional view of one of the control mounting struts for the reaction engine and as viewed on line 13—13 of Fig. 14;

Fig. 14 is a top plan view of the engine mounting strut and of its connection with the ship.

Referring now particularly to Figs. 1 and 2, there is shown a space ship 20 with the rotary reaction engine 23 of the present invention installed therein to lift and propel the ship through space. The space ship is preferably of circular shape and has a control cab 21 projecting upwardly from the top and toward one edge thereof. In the bottom of the ship is a recess 22 to accommodate the rotary reaction engine 23. This reaction engine 23 is also circular in shape and has on its periphery three ball projections 24, 25 and 26 lying one hundred twenty degrees apart to which vertically-extending fluid pressure cylinder devices 24', 25' and 26' are respectively connected by ball and socket connections, Figs. 13 and 14. By virtue of this three-point suspension of the reaction engine, the engine is tilted universally to any angle by the fluid cylinder devices to effect the movement of the space ship in the desired direction. To effect a forward and upward thrust from a floor of the ship, the reaction engine is tilted within the recess to the dotted line position, as illustrated in Fig. 1. The lifting gas discharge is generally of umbrella shape and is directed downwardly and rearwardly from the engine by a rotating air charging and firing chamber part by means to be later described.

The control cab 21 may be located in the center of the ship. The reaction engine is substantially a self-contained unit. Its auxiliary equipment is under a dome 23'.

Mounted for pivotal retracting movement on the bottom of the space ship and angularly spaced from one another are four retractable landing gear devices 27, 28, 29 and 30. These devices can be operated by the usual present day mechanism for extending and retracting the same into the bottom of the ship. The control cab 21 has a front window opening 31 and side window openings 32 and 33. The body of the ship has a series of window openings 34 surrounding the same.

Referring now particularly to Figs. 5 and 8, 36 represents the main body of the engine which is circular in shape. At the center of the main body 36 is a thickened hub portion 37 that has a depending sleeve formation 37'.

Concentric with and outwardly of the thickened hub portion is a series of firing chamber openings 38, twelve in number and angularly spaced from one another on the same circular axis. Outwardly of the firing chambers 38 and concentric therewith is a second series of firing chamber openings 39. The openings 39 of the second series are respectively angularly spaced between the respective openings 38 of the first series.

Fitted over the openings 38 and 39 are respectively upper firing chambers 40 and 48, each having radially extending peripheral flange 41 through which fastening bolts 42 extend to secure the firing chamber to the top surface of the body 36. In the top of the firing chamber 40 is a spark plug 43 which has a wire 44 that will extend to a distributor 72 forming a part of the electrical ignition system in the usual manner. The interior of firing chamber is rounded to capture and retain the fuel and ensure high compression.

A fuel feed nozzle 45 is connected into the inner side of each firing chamber 40 and 48 to supply the chambers with fuel. This fuel nozzle has a pipe 46 which feeds liquid fuel or gasoline to the nozzle and a pipe 47 which feeds compressed fuel combined with oxygen to the nozzle which is used as when starting the rotary engine and for high altitudes or other times when excess fuel is needed. While two concentric series or rows of firing chambers are shown, it will be understood that there may be more concentric series of firing chambers provided depending upon the lifting power desired and the size of the space ship to be lifted and propelled.

Each fuel nozzle 45 has a valve 45' with a valve press rod 49 that is periodically engaged by its operating rod 51 or 51' slidable in radially-spaced bearing supports 52 and 53 and in slots 91 in the hub portion 37 for engagement with a timing cam 56 fixed to a central rotating sleeve or hollow shaft 55 journalled in the depending sleeve formation 37' and having a flange 54 on its lower end to which a hollow air-distributing and discharging rotating blade structure 57 is secured by fastening bolts 58. This rotating blade structure 57 is journalled on the outer surface of the depending sleeve portion 37' and spans substantially the full diameter of the body 36 and traverses under both rows of firing chambers at each end thereof. The blade structure 57 is hollow so that air can be delivered to the firing chambers to mix with the fuel therein and to condition each firing chamber for combustion. Ball bearing assemblies, not shown, will preferably be used in the journal connections of the sleeve 55' and the blade structure with formation 37'.

Fixed to the top of the hub portion 37 by fastening bolts 59 is an annular support or block 60 that has an internal peripheral flange 61 in which a thrust bearing 62 is mounted. This thrust bearing has an upper race 62' that is secured to the rotating sleeve by a pin 61' and a lower race 62" is secured to the flange by a pin 61". A collar and the flange 54 hold the sleeve 55' against downward displacement while the lower race 62" holds it against upward displacement. The blade structure 57 being secured to the sleeve 55' is thus fixed against downward displacement from the underside of the main body 36.

Upon the hollow shaft 55 and above the thrust bearing 62 is a bevel gear 63 that meshes with diametrically-opposing gears 64 and 65 and fixed respectively to shafts 66 and 67 journalled in the annular support 60. The shaft 66 is connected by a coupling 68 to a fuel pump 69 to which the fuel injector nozzles may be connected in the usual manner that is mounted on a supporting block 70 which is in turn connected by a driving shaft 71 with a distributor 72 forming a part of the ignition system by which electric current is delivered in timed sequence through the several wires 44 to the several spark plugs 43 of the firing chambers 40 and 48.

On the upper end of the annular support 60 is a cover plate 73 having a central hollow portion 74 to which a depending shaft 75 is anchored as indicated at 76. This shaft 75 depends downwardly through the rotating hollow shaft 55 for a purpose to be later mentioned.

Lying above this cover plate 73 is a centrifugal air intake pump 77 having a funnel-shaped central air inlet 78 and an outlet air duct 79 leading from the outer periphery of a pump housing 77' and that connects by a flange 79' with a flange 80' of a delivery extension 80 that is fixed to the side of the hollow portion 74 of the cover plate 73, to deliver air thereinto and downwardly through the hollow shaft 55. A thin hollow tubing 81 is fixed within the central portion 74 and depends into the upper end of the hollow shaft 55 to prevent the escape of air over the upper end of the shaft 55 and into the annular support 60.

The pump 77 is fastened in the top of the engine dome 23' by bolts 82. A rotating vane structure 83 is journalled in the housing 77' and its drive shaft 84 depends through a vertical sleeve support 85 and through the top plate 73. The lower end of the shaft 84 has a small gear 86 fixed thereto and is driven by a large drive gear 87 on the upper end of the rotating hollow shaft 55.

The shaft 67 is connected by a coupling 88 with an electric generator 89 that is supported on a block 90 and which supplies the ship with the necessary current for ignition and lighting purposes.

The operating rods 51 and 51' radially slide in the slots 91 in the hub portion 37 of the body 36, Fig. 10, and certain of rods slide through the supporting blocks 70 and 90. These rods 51 and 51' also extend outwardly through openings 92 in the lower part of the dome 23'. The rods 51 are short and extend to the valves 45' on the firing chambers 40 while the rods 51' are long and extend to the valves 45' on the firing chambers 48, and engage the valve press rods 49 of the fuel valves 45' in timed sequence as the lobes 56' and 56" of the cam 56 engage the inner ends of the operating rods 51 and 51'. The cam 56 is keyed to the hollow shaft 55 by keys 93 and 93'.

The fuel injector valves 45' are operated in sequence as the blade structure 57 swings under the respective firing chamber openings 38 and 39 to charge the chambers with fuel. At the same time the firing chamber is being supplied with fuel, air is delivered by the blade structure 57 to the firing chamber to provide the explosive mixture with air for effecting combustion. The blade structure 57 has a depending sleeve portion 93 that is journalled preferably by ball bearing assemblies on the exterior of the sleeve formation 37' of the thickened body portion 37.

Flaring downwardly and outwardly from the sleeve portion 93 is an air receiving and delivery portion 94, and within this portion 94 and located to one side of the anchored central shaft 75 is a baffle wall partition 95 that divides the portion 94 into an air receiving compartment 96 to which air is delivered from the lower end of the hollow shaft 55 from the intake pump 77 and an outlet chamber 97 having an opening 98 through which air is delivered to the main chamber 57' of the hollow blade structure 57. The partition 95 has a horizontally-extending thrust bearing 99 that encircles the anchored shaft 75 and thereby provides a support for the lower end thereof as the hollow blade structure 57 rotates thereabout.

The lower end of the blade structure 57 has an annular bottom plate portion 100 that has an air inlet opening 101 through which air from receiving compartment 96 is delivered into a high pressure booster pump indicated generally at 102 and secured by fastening bolts 103 to the transverse plate portion 100, Figs. 5 and 11. This booster pump 102 has a reversing gear mechanism indicated generally at 104 that comprises a shaft 105 journalled in a revolving vane-supporting plate 106 and at its upper end by a ball bearing 106' in a central plate portion 100' that is fixed by fastening bolts 107 to the lower end of anchored shaft 75. A beveled plate gear 108 is fixed to the shaft 105 by a pin 108'. A depending gearing housing 109 is fixed to the underside of the central plate portion 100' and carries opposing bevel pinion gears 110 and 111 that mesh with the bevel plate gear 108 and a bottom bevel gear 112 that is pinned to the hub of the vane-supporting plate 106 to drive the plate 106.

The lower end of the shaft 105 extends downwardly through the vane-supporting plate 106 and has a crank 113 secured thereto that extends downwardly through the bottom of housing 102' offset from the center thereof. As the blade structure 57 rotates, the crank 113 is turned and the shaft 105 and upper gear 108 are rotated. This gear 108 drives the opposing pinion gears 110 and 111 that in turn drive the bottom bevel gear 102 and the vane-supporting plate 106 in a reverse direction with relation to the air-distributing blade structure 57.

Slidable on their lower edges over the upper surface of the revolving vane-supporting plate 106 and carried thereby are four curved vanes 115 that are swingable by hinge pins 115' in side recesses 116' of a sleeve portion 116 extending upwardly from the vane-supporting plate 106 and which are worked in and out by links 117 pivotally connected to a ring device 118 on the crank 113 and pivotally connected to rod portions 115" on the outer ends of the vanes 115 that depend respectively through arcuate slots 119 in the revolving plate 106 and in the proper sequence are moved toward and away from a moving curved vertical wall 120 against which the air taken through inlet opening 101 is forced and compressed and expelled through outlet opening 121 into outlet chamber 97 from which it passes through openings 98 to main blade chamber 57' for delivery through the firing chamber openings 38 and 39. The curved vertical wall 120 depends from the underside of the plate portion 100 and rotates therewith in the reverse direction of the curved pump blades 115 and their supporting plate 106.

The air travels outwardly through the chamber 57' to the outer end of the blade structure along its leading edge 57" and through holes 125 therein, Fig. 6, and openings 38 and 39 to the respective firing chambers 40 and 48. The air is delivered under high pressure and in order to prevent the air from escaping from the firing chambers 40 and 48, a leading deflecting and inclined air guiding plate 126 is secured by its arms 126' to the leading edge 57" of the blade structure in advance of the holes 125. Fuel is admitted to the firing chambers at the same time the air is admitted. The upper face 127 of the blade structure 57 runs or sweeps substantially close to the undersurface of the body 36 and over a depending annular head 128 on the undersurface of the body 36 and inside of a peripheral depending flange 129 on the body 36.

The blade structure 57 has automatic explosion-resisting members 131 against which the explosion reacts to move the blade 57 and that drop downwardly from the trailing edge of the blade structure on too heavy or excess explosion in order to prevent damage to the blade structure. These members 131 will take a definite set at times of normal operation. These members 131 are fixed to a shaft 132 that runs parallel to the leading edge of the blade and has an arm 133 to which a tension spring 134 is connected and anchored to a stud 135. This tension spring 134 tends to maintain the automatic explosion resisting members elevated within the blade structure. These explosion resisting members 131 have downwardly and rearwardly inclined elongated slots 136 and 137 through which a portion of the gases can normally escape to give the lifting action to the engine and to the ship. The trailing edge of the blade structure further has guide fins 139 and 138 extending parallel thereto and rearwardly of the rear edge of the explosion resisting blade. It should be noted that the discharge gases will pass through these slots 136 and 137 in the explosion resisting blade. It should be noted that the discharge gases will pass through these slots 136 and 137 in the explosion resisting members and through the spaces between the downwardly and outwardly inclined guide fins 138 and 139 and are directed downwardly and outwardly to the trailing edge of the blade structure 57. Centrifugal action will tend to move the gas discharge outwardly from the periphery of the engine body 36 and the resultant shape of the discharge pattern will resemble an umbrella.

At the same time the discharge from one firing chamber advances the blade structure to the next firing chamber. The upper face of the blade structure is downwardly relieved to provide a leakage passage 141 through which the explosive gases from the chamber which has been fired are directed in a direction toward the leading edge of the blade structure and into the succeeding firing chamber which is being charged with fuel and air so as to compress the explosive mixture therein prior to igniting the same. When the rear portion of the blade structure has covered the succeeding opening under the firing chamber, the blade structure when taken with the firing chamber provides a complete combustion chamber in which the fuel and air has been compressed and which, when ignited, causes the rotation of the blade structure and the delivery of the discharge gases from under the firing chambers and off the trailing edge of the blade structure in the direction above indicated. Each firing chamber assembly is automatically charged with air from the blade structure and mixed with the fuel and this mixture compressed by the firing action of one of the chambers. This takes place on both ends of the blade structure and at the opposite sides of the engine to give a stabilized and balanced lifting action of the engine and the ship to which it is connected.

It should now be apparent that there has been provided a rotary reaction engine adapted to expel an umbrella shaped gas lifting discharge from its underside that serves to lift the space ship in a direction predetermined by the angular setting of the engine relative to the ship by means of the adjustable three point suspension connections. It will also apparent that the rotary engine carries its own auxiliary equipment except for its fuel supply tanks which will be located within the ship body. The ship body can be of any size or shape and may have either one or several of these reaction engine units attached thereto. The controls for the engine or engines will extend to the control cab in the usual manner.

While various changes may be made in the detail construction, it shall be understood that such changes shall be within the spirit and scope of the present invention as defined by the appended claims.

What is claimed is:

1. A rotary reaction engine comprising a main body having a series of firing openings therein, firing chambers connected to the main body and disposed above said firing openings, fuel and ignition means connected with the firing chambers, a rotating hollow air-distributing blade structure journalled under the main body and operable on the underside thereof traversing said firing openings and supplying air to the firing chambers for mixture with the fuel being supplied thereto, said blade structure being propelled by the discharge of the firing chambers discharging lifting gases downwardly beneath the engine, means for supplying compressed air to the blade structure, and biased explosion-resisting members provided on the trailing edge of the blade structure against which the discharge is effected and releasable downwardly therefrom upon excessive explosion from the firing chambers to prevent injury to the hollow blade structure.

2. A rotary reaction engine comprising a main body having a series of firing openings therein, firing chambers connected to the main body and disposed above said firing openings, fuel and ignition means connected with the firing chambers, a rotating hollow air-distributing blade structure journalled under the main body and operable on the underside thereof traversing said firing openings and supplying air to the firing chambers for mixture with the fuel being supplied thereto, said blade structure being propelled by the discharge of the firing chambers discharging lifting gases downwardly beneath the engine, means for supplying compressed air to the blade structure, said means for supplying air to the rotary blade comprising a rotary hollow shaft connected to said blade structure and extending upwardly through the main body, an air intake pump driven by said hollow shaft and connected thereto to deliver air downwardly therethrough and through the blade structure, a compression pump carried by the blade structure for receiving the air therefrom and serving to compress air and direct it through the blade structure for delivery to the firing openings, and means anchored to the body and extending downwardly through said shaft for engagement with said pump against which said pump reacts.

3. A rotary reaction engine comprising a main body having a series of firing openings therein, firing chambers connected to the main body and disposed above said firing openings, fuel and ignition means connected with the firing chambers, a rotating hollow air-distributing blade structure journalled under the main body and operable on the underside thereof traversing said firing openings and supplying air to the firing chambers for mixture with the fuel being supplied thereto, said blade structure being propelled by the discharge of the firing chambers discharging lifting gases downwardly beneath the engine, means for supplying compressed air to the blade structure, said firing openings being arranged in concentric circular rows of even number of openings in each row and the respective openings of one row angularly alternating with the respective openings of the other row.

4. A rotary reaction engine comprising a main body having a series of firing openings therein, firing chambers connected to the main body and disposed above said firing openings, fuel and ignition means connected with the firing chambers, a rotating hollow air-distributing blade structure journalled under the main body and operable on the underside thereof traversing said firing openings and supplying air to the firing chambers for mixture with the fuel being supplied thereto, said blade structure biased explosion-resisting members provided on the trailing edge of the blade structure against which the discharge is effected and releasable downwardly therefrom upon excessive explosion from the firing chambers to prevent injury to the hollow blade structure, said hollow blade structure being relieved on its cooperating face to provide a passage through which the explosive discharge gases may communicate with the succeeding firing chamber to compress the fuel and air supplied thereto by the fuel injection means and the blade structure preparatory to the ignition thereof.

5. A rotary reaction engine comprising a circular main body having a central opening, a hollow shaft journalled in said central opening, firing openings arranged in concentric circular rows about said body and with the respective firing openings of one row angularly alternating with the respective firing openings of the other row, firing chambers secured to said body over said firing openings, a hollow blade structure journalled on the underside of said body and connected to said hollow shaft to drive the same, fuel injection means connected to the respective firing chambers on the top of the body, timing means on said hollow shaft engageable with the fuel injection means in sequence to charge the firing chambers with fuel, air pump means connected to said hollow shaft to be driven by the same and to drive air under pressure through the hollow blade structure, said hollow blade structure having a discharge air outlet for directing air under pressure to the firing chambers as the blade structure rotates thereunder to close off the firing chamber, and ignition and distributor means driven by the hollow shaft for discharging the firing chambers in sequence upon being charged with the combustible mixture, the discharge being actionable upon the blade to advance the same and projected downwardly from the rear of the blade to effect a lifting thrust upon the engine.

6. A rotary reaction engine comprising a circular main body having a central opening, a hollow shaft journalled in said opening, firing openings arranged in concentric circular rows on said body and with the respective firing openings of one row angularly alternating with the respective firing openings of the other row, firing chambers secured to said main body over said openings, a hollow blade structure journalled on the underside of said body portion and connected to said hollow shaft to drive the same, fuel injection means connected to the respective firing chambers on the top of the body, timing means on said hollow shaft engageable with the fuel injection means in sequence to charge the chambers with fuel, an intake air pump supported on the top of the circular body and having an air delivery extension connected to the upper end of said hollow shaft to deliver air under pressure thereto, drive gear means connected between the upper end of the shaft and the pump to drive the same, booster pump means connected to the blade structure, passage means in the blade structure for receiving the air delivered from the lower end of the hollow shaft and directing the same to the booster pump on the blade structure, said booster pump having an outlet for discharging air under high pressure to the blade structure, a reversing gear mechanism for operating said booster pump and an anchoring rod extending downwardly through the hollow shaft and connected between the body and the reversing gear drive mechanism for the booster pump, said hollow blade structure having air openings adjacent its leading edge for directing the air under pressure to the respective firing chambers in sequence as the blade structure is rotated under the main body, said blade structure having opening means for directing the discharge gases downwardly and rearwardly from the rear edge of the blade structure to effect a lifting thrust upon the engine.

7. A rotary reaction engine comprising a main circular body having a central sleeve depending therefrom, concentric rows of firing openings lying outwardly of said sleeve portion and about the body, said firing openings of the respective rows angularly alternating respectively with one another, firing chambers disposed over the respective openings, fuel injection valves connected with the firing chambers, a hollow shaft extending through the sleeve portion and journalled therein, cam means fixed to said shaft, valve operating rods extending radially outwardly from the cam means to open the fuel injection valves in timed sequence, a block overlying the circular body and fixed thereto, thrust bearing means mounted in the block and connected with said shaft to support the same within the body, drive gear means connected to said shaft and extending laterally from said block, auxiliary equipment attached to said drive gear means, a cover plate mounted upon said block, said cover plate having a central air inlet communicating with the upper end of said hollow shaft, a dome cover mounted on said body and overlying said block and said auxiliary equipment, an air intake pump mounted on said dome and having an air discharge tube connected with the air inlet opening of the block cover plate, drive means extending from said pump through said cover and connected with the upper end of said hollow shaft, a hollow blade structure journalled upon said depending sleeve of the body portion and operable over the underside of said main body and said firing chamber openings, an anchor shaft fixed to the block cover plate and depending through said hollow shaft, a booster pump mounted on said hollow blade structure, reverse drive gear mechanism for driving the booster pump between said anchor shaft and the hollow blade structure, said blade structure having an air receiving chamber for directing air from the lower end of said hollow shaft to said pump and a discharge chamber through which air from said booster pump is directed through the blade structure, said blade structure having openings adjacent to its leadng edge for directing air into the firing chamber openings of the main body, said hollow blade structure further having discharge relief means on the rear portion thereof for directing the lifting discharge gas downwardly and outwardly from the rear portion of the blade structure, said blade structure further having leakage passage means for directing the flow of combustion gases from one firing opening to a succeeding firing opening to compress the fuel and air delivered thereto and ignition means for said firing chambers and operable by said auxiliary equipment.

References Cited in the file of this patent

UNITED STATES PATENTS

| | | |
|---|---|---|
| 1,720,939 | Wilkin | July 16, 1929 |
| 1,918,277 | Marguglio | July 18, 1933 |
| 1,964,620 | Cernoch | June 26, 1934 |
| 2,406,499 | Jandasek | Aug. 27, 1946 |
| 2,582,809 | Weir | Jan. 15, 1952 |